US009138817B1

(12) United States Patent
Khachaturian

(10) Patent No.: US 9,138,817 B1
(45) Date of Patent: Sep. 22, 2015

(54) METHOD AND APPARATUS FOR REMOVING UNDERWATER PLATFORMS

(71) Applicant: Jon Khachaturian, New Orleans, LA (US)

(72) Inventor: Jon Khachaturian, New Orleans, LA (US)

( * ) Notice: Subject to any disclaimer, the term of this patent is extended or adjusted under 35 U.S.C. 154(b) by 0 days.

(21) Appl. No.: 14/029,532

(22) Filed: Sep. 17, 2013

Related U.S. Application Data

(60) Provisional application No. 61/702,125, filed on Sep. 17, 2012.

(51) Int. Cl.
*E02B 17/04* (2006.01)
*B23D 57/00* (2006.01)

(52) U.S. Cl.
CPC .................................. *B23D 57/0084* (2013.01)

(58) Field of Classification Search
CPC ............ B23D 57/0084; B23D 57/0007; E02B 2017/0052; E02D 9/04
USPC ........ 405/195.1–228; 30/92, 93–97; 83/651.1
See application file for complete search history.

(56) References Cited

U.S. PATENT DOCUMENTS

| | | | | |
|---|---|---|---|---|
| 2,915,819 A | * | 12/1959 | O'Day et al. | ................... 30/103 |
| 3,056,267 A | * | 10/1962 | McRee | .......................... 405/191 |
| 3,955,372 A | | 5/1976 | Pogonowski et al. | |
| 4,118,942 A | | 10/1978 | Liautaud | |
| 4,389,141 A | | 6/1983 | Cumings | |
| 4,619,556 A | * | 10/1986 | Parra | .......................... 405/195.1 |
| 4,768,899 A | * | 9/1988 | Dysarz | ......................... 405/195.1 |
| 4,808,037 A | * | 2/1989 | Wade et al. | .................... 405/226 |
| 5,361,748 A | * | 11/1994 | Matteucci | ....................... 125/21 |
| 5,755,299 A | * | 5/1998 | Langford et al. | ............. 175/375 |
| 7,036,599 B2 | * | 5/2006 | Matteucci | ...................... 166/361 |
| 7,527,006 B2 | | 5/2009 | Khachaturian | |
| 7,621,321 B1 | * | 11/2009 | Remedies et al. | ........... 166/85.1 |
| 7,845,296 B1 | | 12/2010 | Khachaturian | |
| 7,886,676 B2 | | 2/2011 | Khachaturian | |
| 8,061,289 B2 | | 11/2011 | Khachaturian | |
| 8,240,264 B2 | | 8/2012 | Khachaturian | |
| 8,475,081 B2 | * | 7/2013 | Clark, et al. | .................. 405/156 |
| 8,746,228 B2 | * | 6/2014 | Jenkins | ........................... 125/21 |
| 2002/0108553 A1 | * | 8/2002 | Rolfsnes | ....................... 114/265 |
| 2004/0216570 A1 | * | 11/2004 | Clark et al. | ....................... 83/13 |
| 2006/0127186 A1 | * | 6/2006 | Raether | ....................... 405/195.1 |
| 2008/0022830 A1 | * | 1/2008 | Lawler et al. | ................ 83/651.1 |
| 2008/0131209 A1 | * | 6/2008 | Thomas | ........................ 405/198 |
| 2009/0266552 A1 | * | 10/2009 | Barra et al. | .................... 166/339 |
| 2009/0314149 A1 | * | 12/2009 | Clark, II | ....................... 83/651.1 |
| 2010/0186564 A1 | * | 7/2010 | Pierce | ................................ 83/72 |

* cited by examiner

*Primary Examiner* — Tara M. Pinnock
(74) *Attorney, Agent, or Firm* — Garvey, Smith, Nehrbass & North, L.L.C.; Charles C. Garvey, Jr.; Julia M. FitzPatrick

(57) ABSTRACT

A method is provided for removing an abandoned marine platform from a seabed. The platform extends below the seabed mud line. In order to remove the platform, a frame is provided having a perimeter that surrounds an open center. The frame is lowered over the platform wherein the platform occupies the open center portion. A movable cutter cable is fitted to the frame. At least a part of the cutter cable is positioned below the mud line. The cutter is moved relative to the frame to cut the platform below the mud line. Such movement can be a back and forth movement wherein the cutter cable moves in a first direction, stops and then moves in a second direction that is generally opposite the first direction. A lifting device can employ two vessels and two frames, each frame bridging from one vessel to the other. Winches on the vessel can be used to provide movement to the cutter cable. These same winches can take up cable slack as cutting moves from one platform member (e.g. leg, jacket leg, piling, etc) to another.

23 Claims, 20 Drawing Sheets

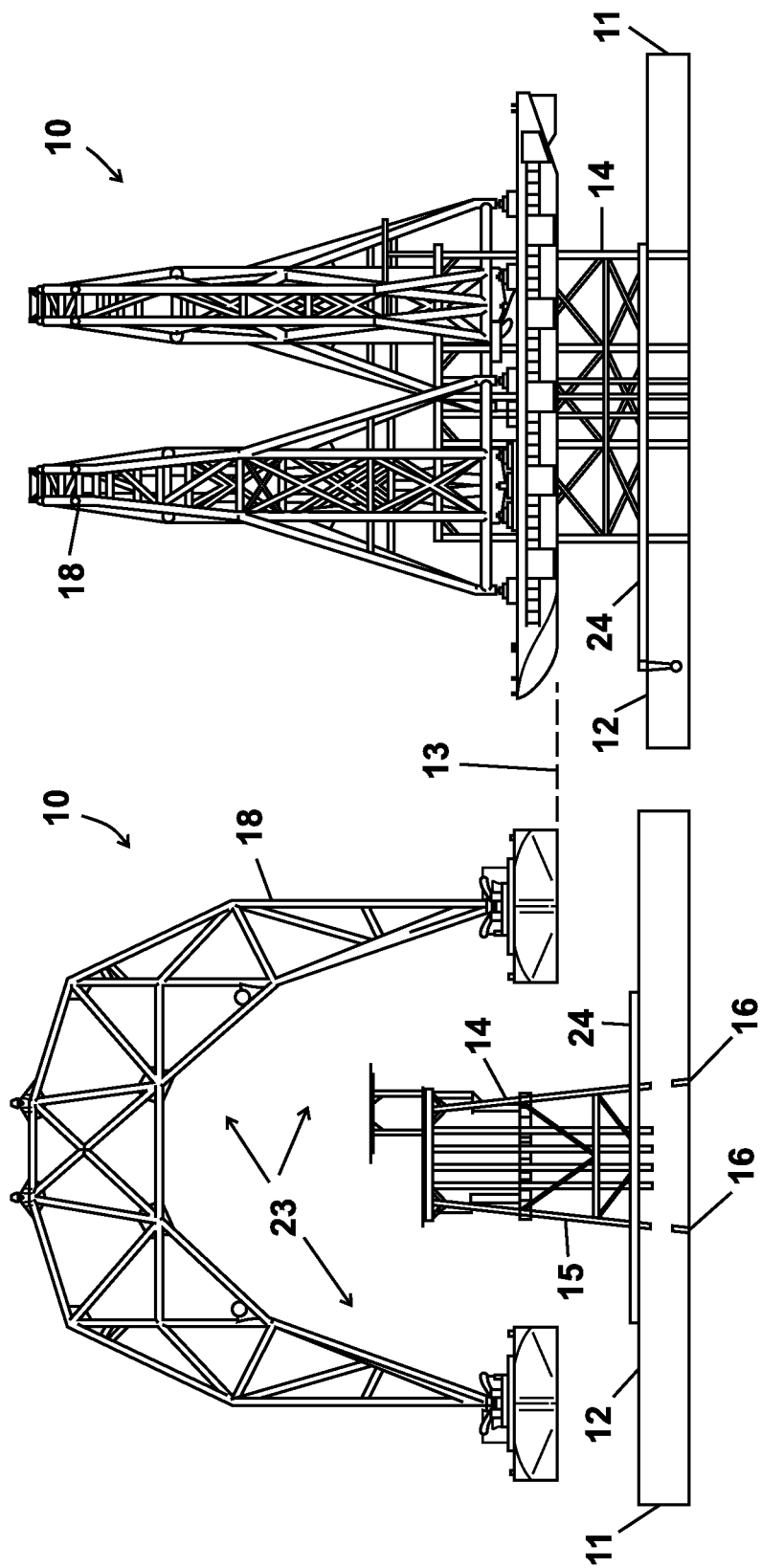
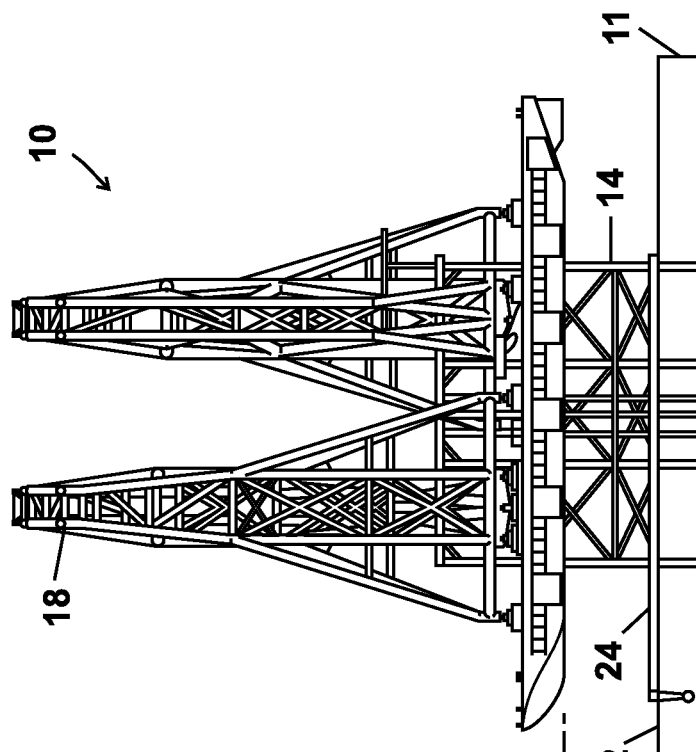

FIG. 14
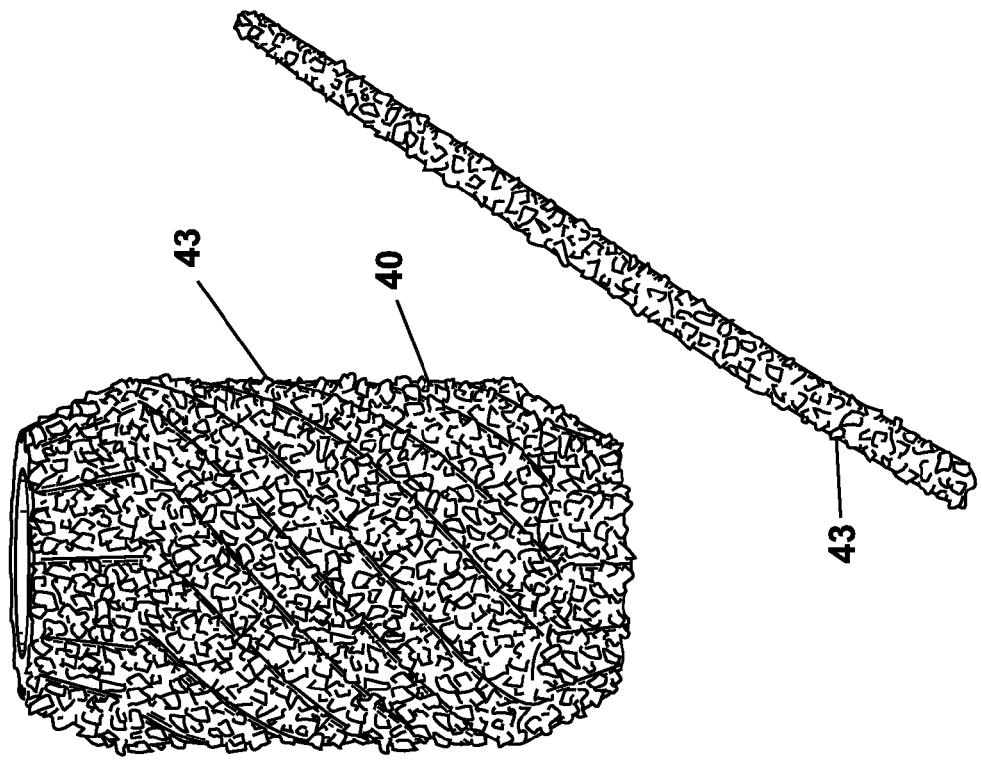
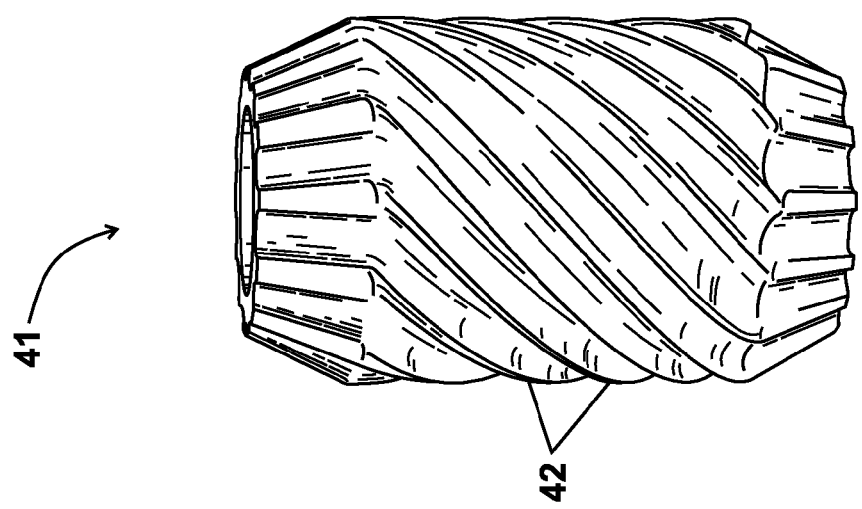

METHOD AND APPARATUS FOR REMOVING UNDERWATER PLATFORMS

CROSS-REFERENCE TO RELATED APPLICATIONS

This is a nonprovisional patent application of U.S. Provisional Patent Application Ser. No. 61/702,125, filed 17 Sep. 2012, which is hereby incorporated herein by reference. Priority of U.S. Provisional Patent Application Ser. No. 61/702,125, filed 17 Sep. 2012, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the removal of abandoned or storm damaged offshore marine platforms such as oil well drilling or oil well production platforms. Even more particularly, the present invention relates to a method and apparatus for the removal of an abandoned or storm damaged offshore oil well drilling or production platform wherein a portion of the platform extends below the mudline and wherein a specially configured frame is lowered to the seabed, a portion of the frame extending below the mudline, the frame carrying a cable fitted with (e.g., tungsten carbide covered) cutting members that can be manipulated with a cable to cut the platform below the mudline.

2. General Background of the Invention

Marine platforms such as oil well drilling platforms and oil well production platforms must be removed once they are abandoned or severely storm damaged. These platforms often include a jacket which is secured to the seabed by means of piling that are driven through vertical or longitudinally extending members of the jacket. Such an arrangement of a jacket that supports a platform is well known in the art (e.g., see U.S. Pat. Nos. 3,955,372; 4,118,942 and 4,389,141, each incorporated herein by reference.

Upon the abandonment of an oil well platform such as a drilling platform or a production platform, the platform must be removed because if left alone it becomes a hazard to navigation. Such abandoned or storm damaged marine platforms are desirably removed in their entirety, including portions that extend below the mudline. By the cutting the platform below the mudline, the seabed does not contain hazards to fishermen's nets as an example.

BRIEF SUMMARY OF THE INVENTION

The present invention provides a method of removing an abandoned marine platform that extends below a seabed mud line.

A frame having a perimeter surrounds an open center portion. A cutter cable is fitted to the frame. The frame is lowered over the platform wherein the platform occupies the open center portion.

At least a part of the cutter cable is positioned below the mud line.

The cable is moved back and forth to cut the platform below the mud line.

In one embodiment, a chain is fitted to the frame below the cutter cable. The chain can be moved (e.g. back and forth) to help sink the cutter cable below the mud line.

In one embodiment, the cutter cable includes portions that extend to the water surface area. In one embodiment, a floating lifting apparatus lowers the frame, the floating lifting apparatus having one or more winches connected to the cutter cable for moving the cutter cable.

In one embodiment, the floating lifting apparatus includes two vessels, each vessel having a winch, and wherein an end portion of the cutter cable is wound upon a said winch.

In one embodiment, the method includes moving the cable in a first direction and then moving the cable in a second direction.

In one embodiment, the cable is moved in a first direction and then the cable is moved in a second direction that is generally opposite the first direction.

In one embodiment, the frame has an upper portion and a plurality of posts that extend downwardly from the upper portion.

In one embodiment, the frame has an upper portion and a plurality of eyelets that are spaced below the upper portion. In one embodiment, the cutter cable is routed through each of the eyelets.

In one embodiment, the eyelets can be opened and closed.

In one embodiment, the frame is generally rectangular, and the open center portion is generally rectangular.

In one embodiment, the cable is moved by winding up cable on one winch while paying out cable from the other winch.

In one embodiment, the cutter cable includes a plurality of sleeves placed upon a wire rope cable.

In one embodiment, the sleeves have an outer coating of tungsten carbide members.

In one embodiment, the present invention provides an apparatus for removing an abandoned marine platform that extends below a seabed mud line.

The apparatus includes a frame having a perimeter that surrounds an open center.

A lifting device lowers the frame over the platform wherein the platform occupies the open center portion.

A movable cutter cable is rigged to the frame.

At least a part of the cutter cable is positioned below the mud line once the frame is lowered.

Power units (e.g. winches) move the cable relative to the frame to cut the platform below the mud line.

In one embodiment, the cable is pulled in a first direction with a winch located on the lift device and then a second direction by another winch while engaging the platform to be cut.

In one embodiment, the platform has multiple leg members and the cable is moved back and forth until each leg member of the platform is cut.

In one embodiment, the platform includes a jacket that has multiple vertical or inclined members and the cable is moved back and forth until each vertical and inclined member of the jacket is cut.

In one embodiment, the platform is anchored to the seabed with multiple piling members and the cable is moved back and forth until each piling member of the platform is cut.

In one embodiment, the frame includes a pair of side beams and a pair of end beams, there being a plurality of frame corners, each corner defined by a connection of one beam to another beam, and a plurality of posts extend downwardly from the beams. Each post has a fitting and the cutter cable connects to the fittings.

The lifting device can be a floating apparatus. The lifting device can be made according to one or more of U.S. Pat. Nos. 8,061,289, 8,240,264, 7,886,676, 7,845,296 and 7,527,006, each hereby incorporated herein by reference.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is an end view of a preferred embodiment of the apparatus of the present invention;

FIG. 3 is a side view of a preferred embodiment of the apparatus of the present invention;

FIG. 14 is a partial perspective view of a preferred embodiment of the apparatus of the present invention illustrating the individual members of the cutter cable;

DETAILED DESCRIPTION OF THE INVENTION

Figure 1:
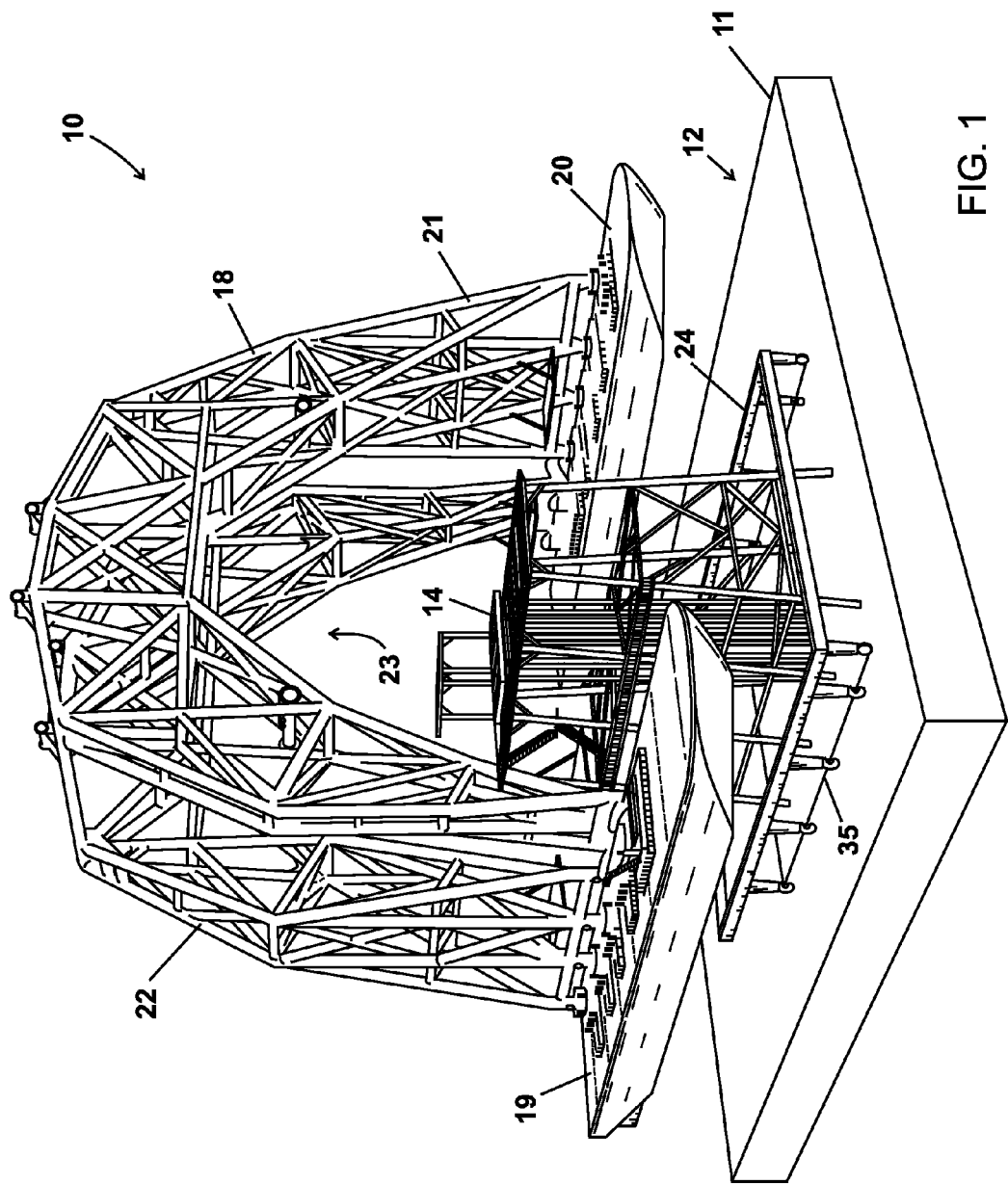
FIG. 1 is a perspective view of a preferred embodiment of the apparatus of the present invention.

FIGS. 1-9 show generally a preferred embodiment of the apparatus of the present invention designated generally by the numeral 10. In FIGS. 1-9 there can be seen a seabed 11. A mudline 12 is illustrated as basically the upper surface of seabed 11. A water surface 13 is shown at a distance above seabed 11 and mudline 12 in FIGS. 2 and 3.

A marine platform 14 is shown anchored to seabed 11. Marine platform 14 often includes a jacket 15 that is anchored to the seabed using piling. Such a marine platform 14 can provide a deck area 16 that houses production equipment, supplies and/or oil well drilling equipment. A heliport 17 is often provided on such amarine platform 14 for enabling helicopters to land and exchange crew members.

Lifting apparatus 18 is shown in FIGS. 1-9. The lifting apparatus 18 can be any device that can be used to raise and lower frame 24. In FIGS. 1-9, the lifting device 18 shown can employ spaced apart vessel or hulls 19, 20. Each vessel or hull 19, 20 supports a pair of frames 21, 22. The frames 21, 22 are generally an inverted u-shaped, providing an open area or space 23 under each frame 21, 22 as shown. Lifting apparatus 18 can be the type shown and described in U.S. Pat. Nos. 7,527,006, 7,845,296, 7,886,676, 8,061,289, and 8,240,264, each hereby incorporated herein by reference.

Figure 4:
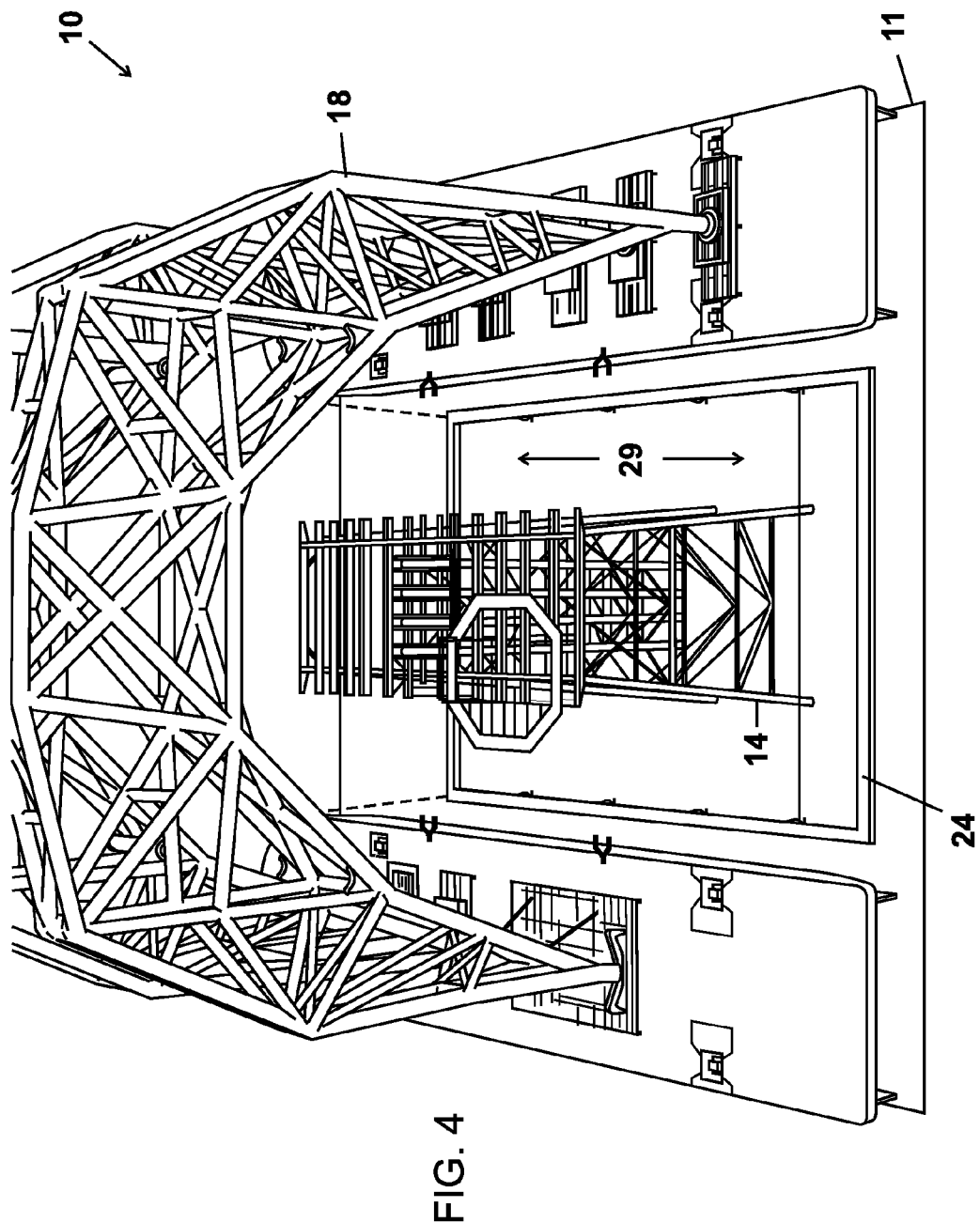
FIG. 4 is a end perspective view of a preferred embodiment of the apparatus of the present invention.
Figure 5:
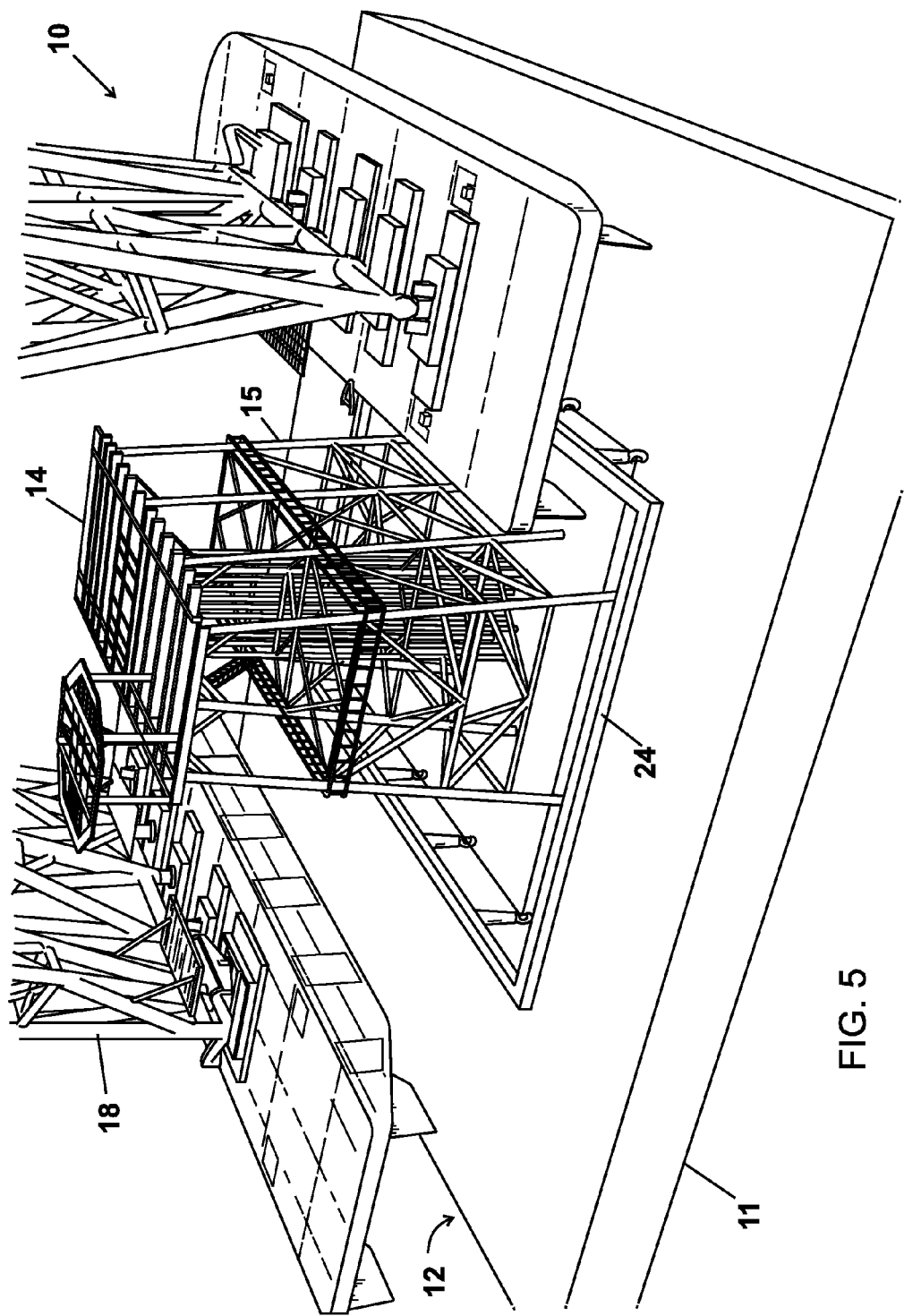
FIG. 5 is a perspective view of a preferred embodiment of the apparatus of the present invention.
Figure 6:
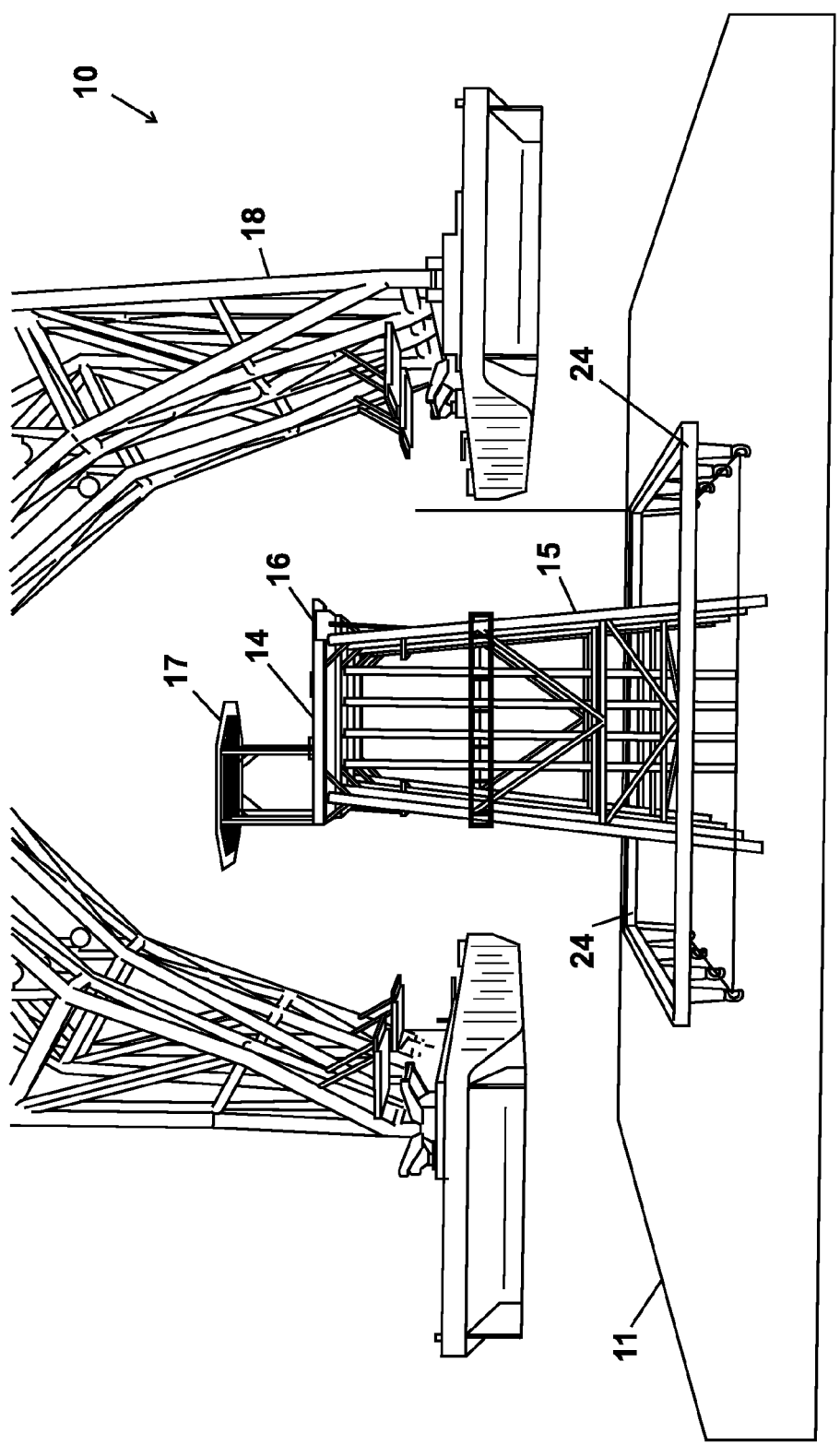
FIG. 6 is a perspective view of a preferred embodiment of the apparatus of the present invention.
Figure 7:
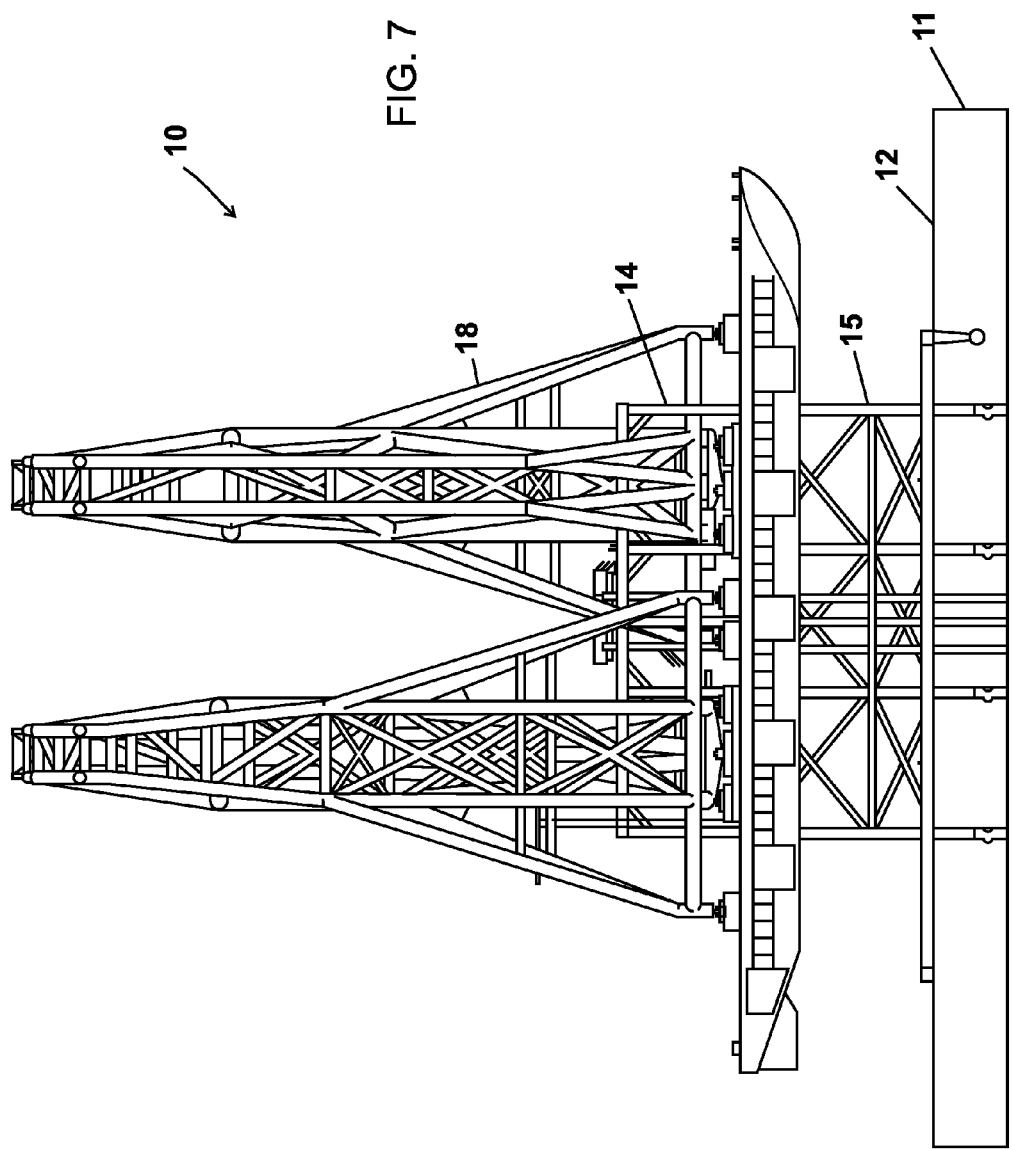
FIG. 7 is a side view of a preferred embodiment of the apparatus of the present invention.
Figure 8:
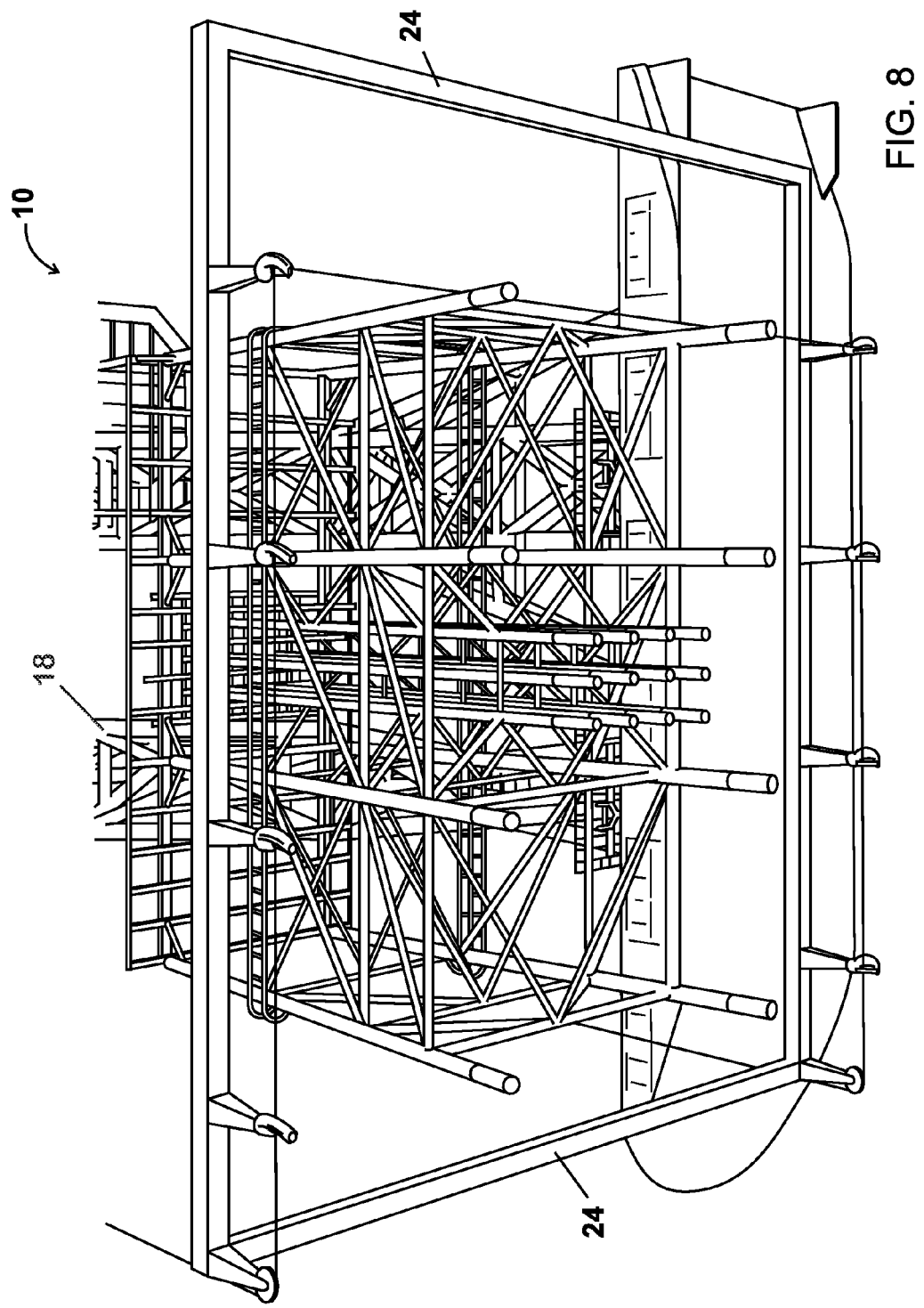
FIG. 8 is a bottom perspective view of a preferred embodiment of the apparatus of the present invention.
Figure 9:
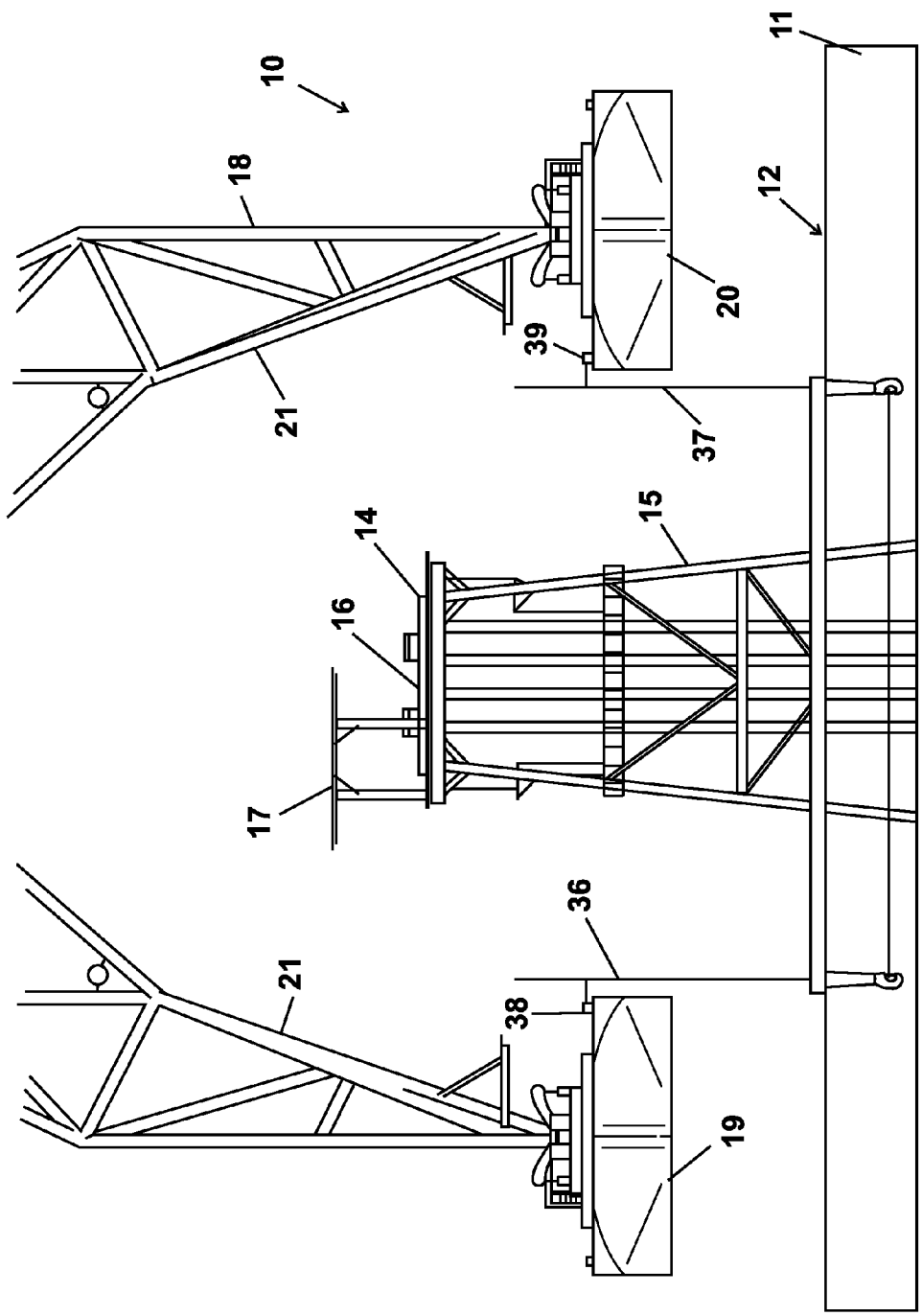
FIG. 9 is an elevation view of a preferred embodiment of the apparatus of the present invention.

Frame 24 provides a pair of spaced apart, generally parallel side beams 25, 26 and a pair of spaced apart, generally parallel end beams 27, 28. The beams 25, 26, 27, 28 can be connected end-to-end to form a rectangle as shown and of welded steel construction as an example. The frame 24 provides an open center 29 that is sized and shaped to fit over the platform 14 as shown in FIG. 4.

Figure 10:
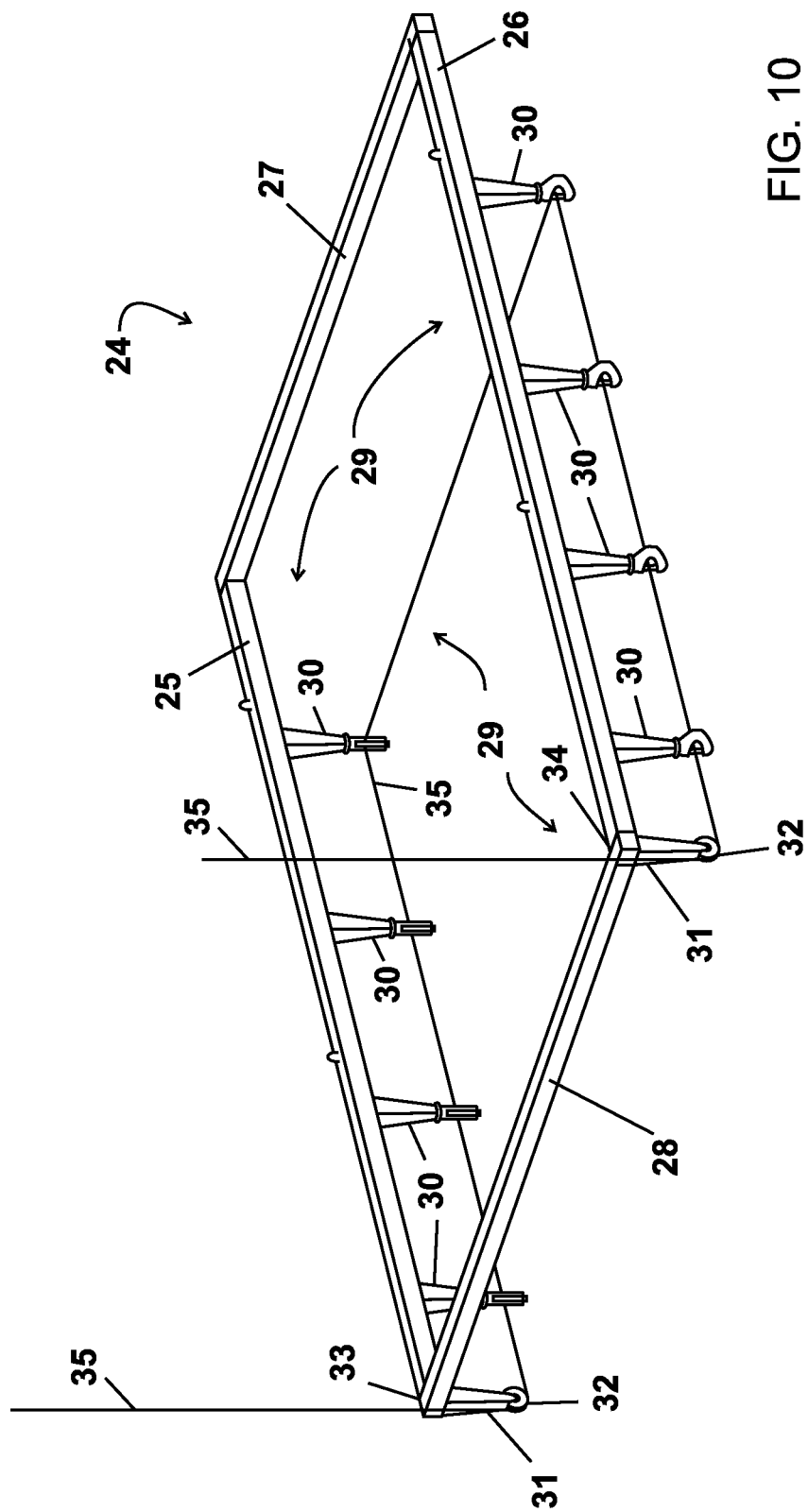
FIG. 10 is a partial perspective view of a preferred embodiment of the apparatus of the present invention.
Figure 11:
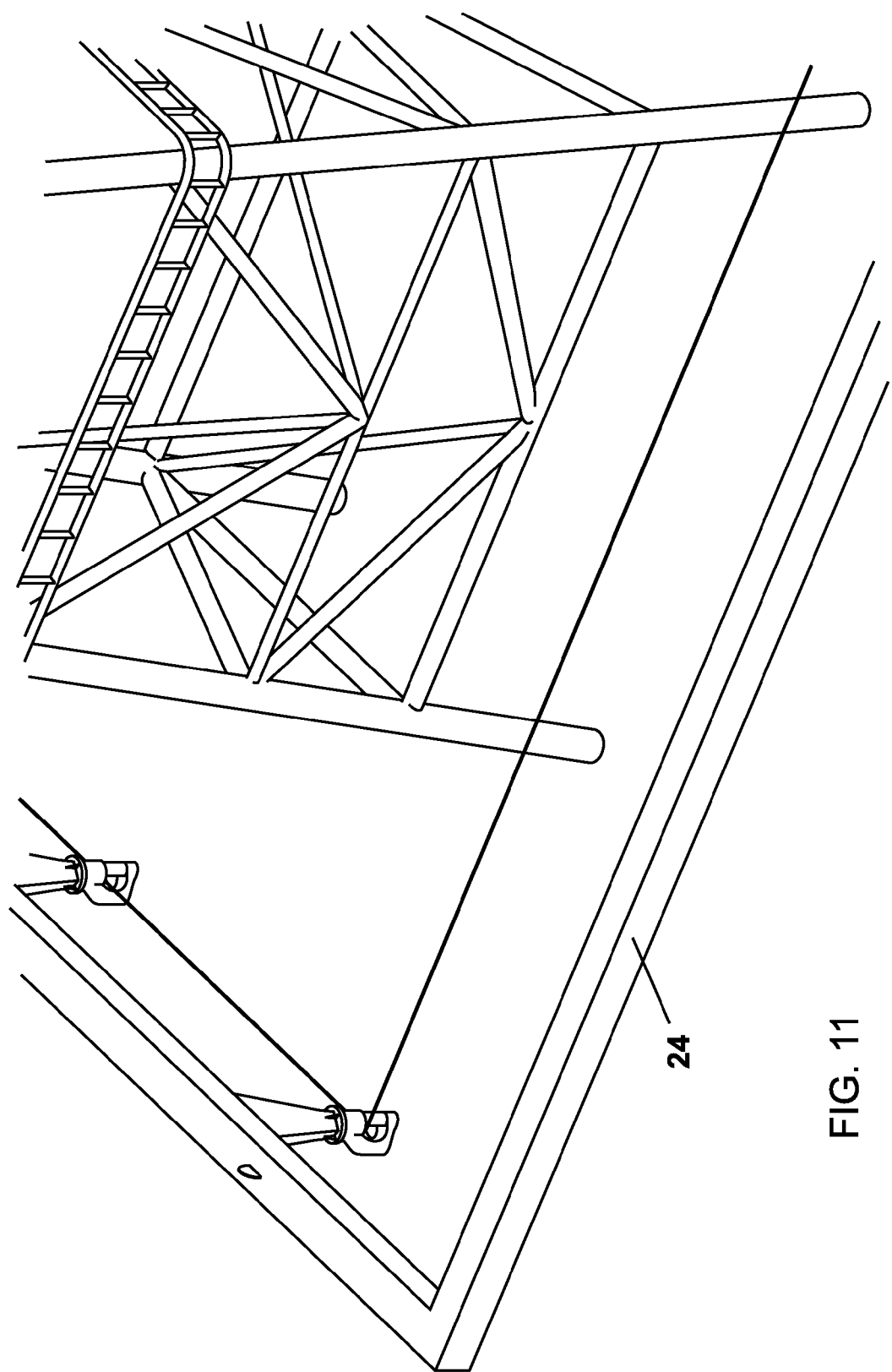
FIG. 11 is a partial perspective view of a preferred embodiment of the apparatus of the present invention.

FIG. 10 shows the frame 24 in more detail. In FIG. 10, the side beams 25, 26 each provide a plurality of downwardly extending columns or posts 30. At the corners 33, 34 are provided columns or posts 31. Each post 31 has a pulley or sheave 32 or other bearing that is receptive of cutting cable 35. As will be described more fully hereinafter, the cutting cable 35 extends from each post 31 upwardly to a vessel 19, 20 wherein a winch is provided. A winch 38 or 39 is mounted on each vessel 19, 20. A first section 36 of cable 35 attaches to a winch 38 on vessel 19. A second section 37 of cable 35 attaches to a winch 39 on vessel 20.

Figure 15:
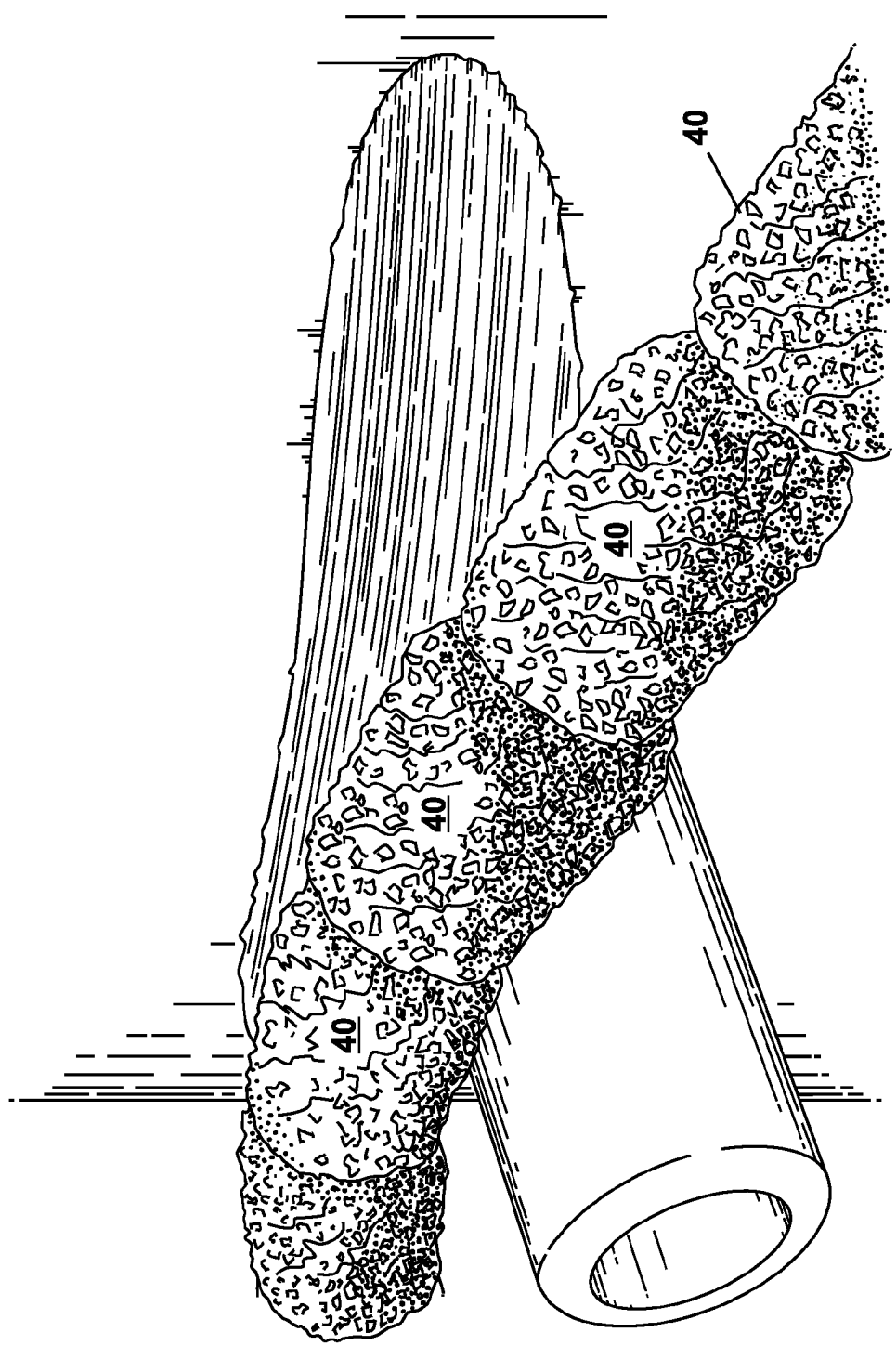
FIG. 15 is a partial perspective view of a preferred embodiment of the apparatus of the present invention illustrating the individual members of the cutter cable.
Figure 16:
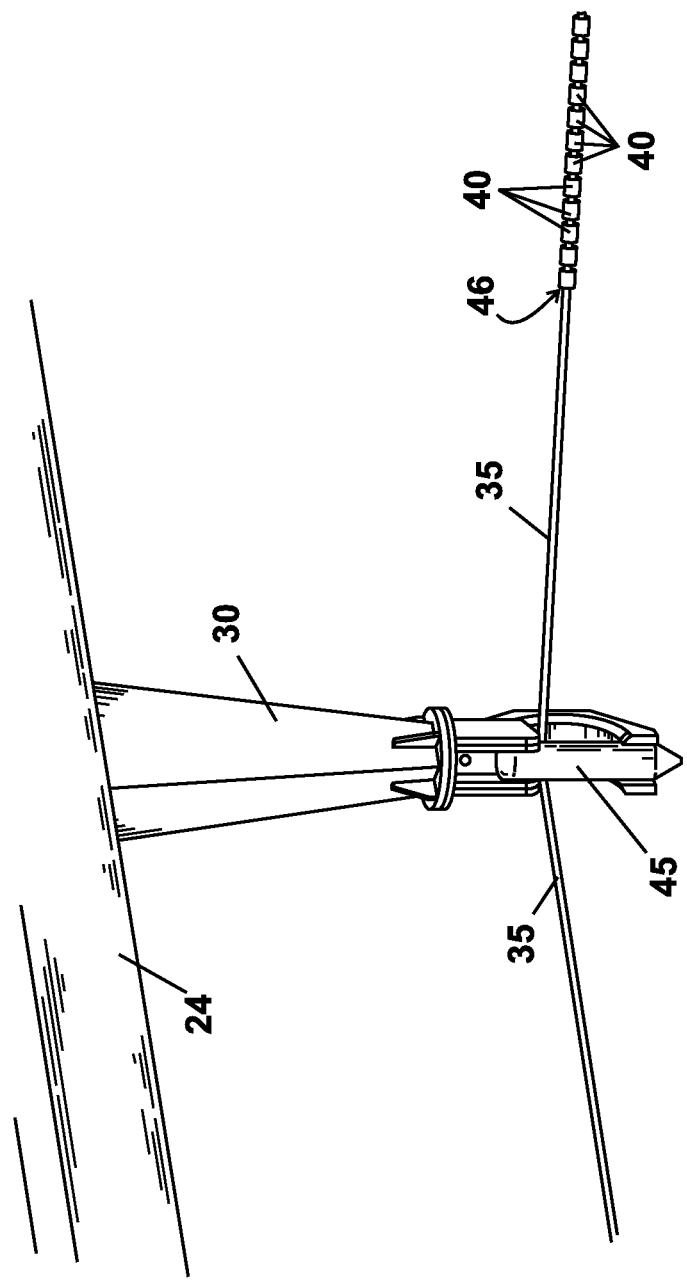
FIG. 16 is a partial perspective view of a preferred embodiment of the apparatus of the present invention illustrating an individual post and fitting or eyelet with movable member and the cutter cable rigged to the fitting or eyelet.
Figure 17:
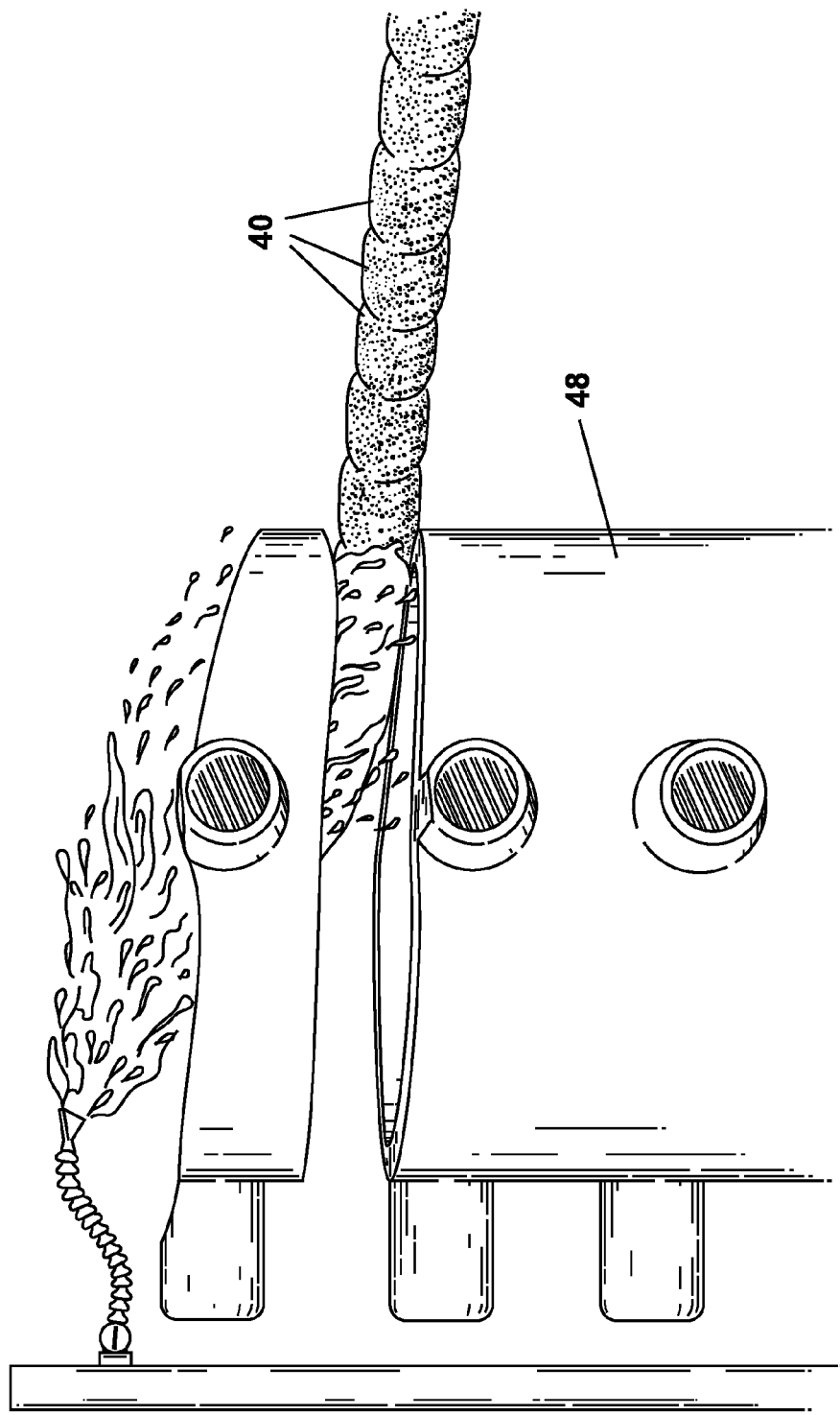
FIGS. 17-21 are perspective views illustrating a cutting of a tubular member or pipe using the cutter cable portion of the apparatus of the present invention.
Figure 18:
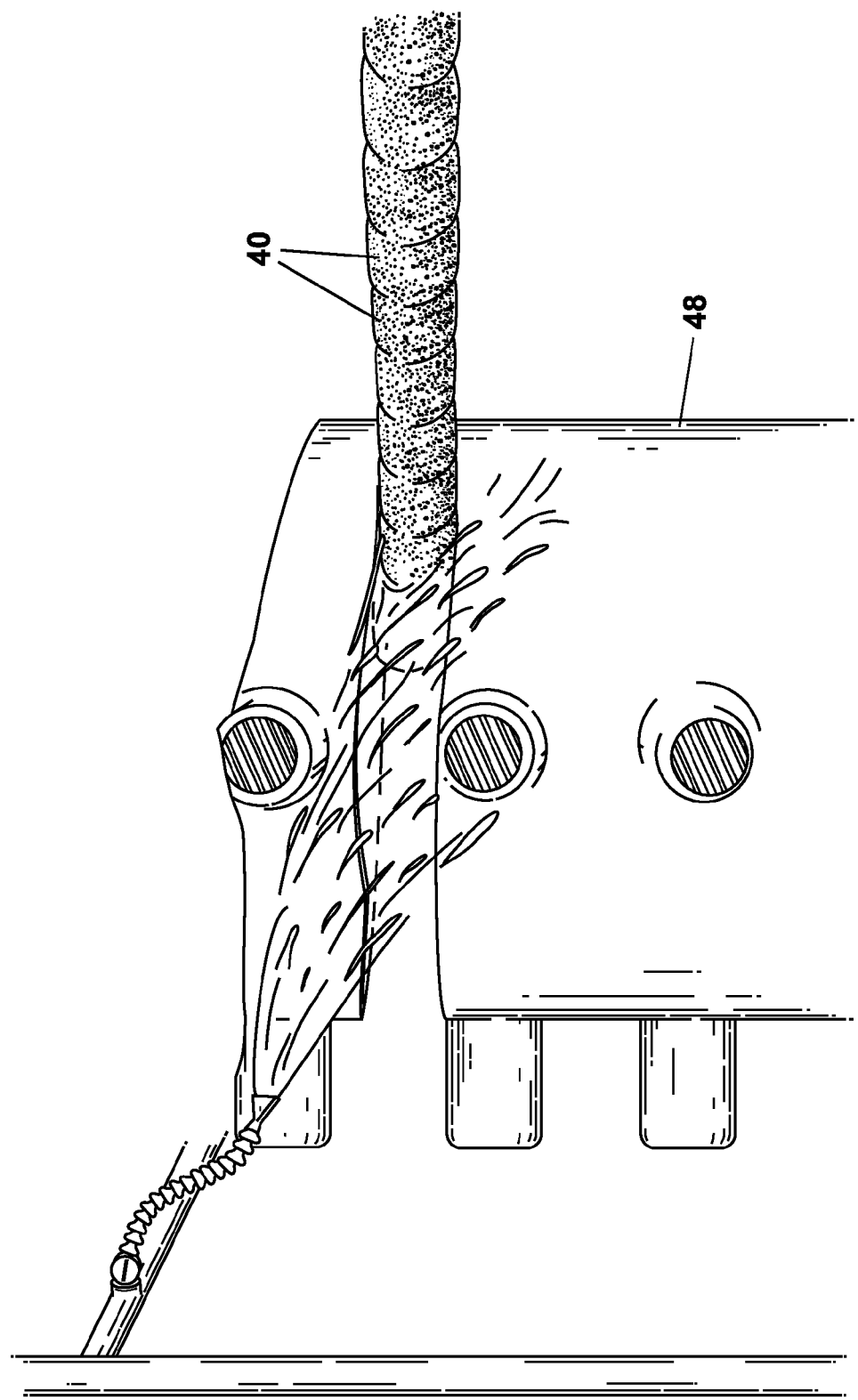
Figure 19:
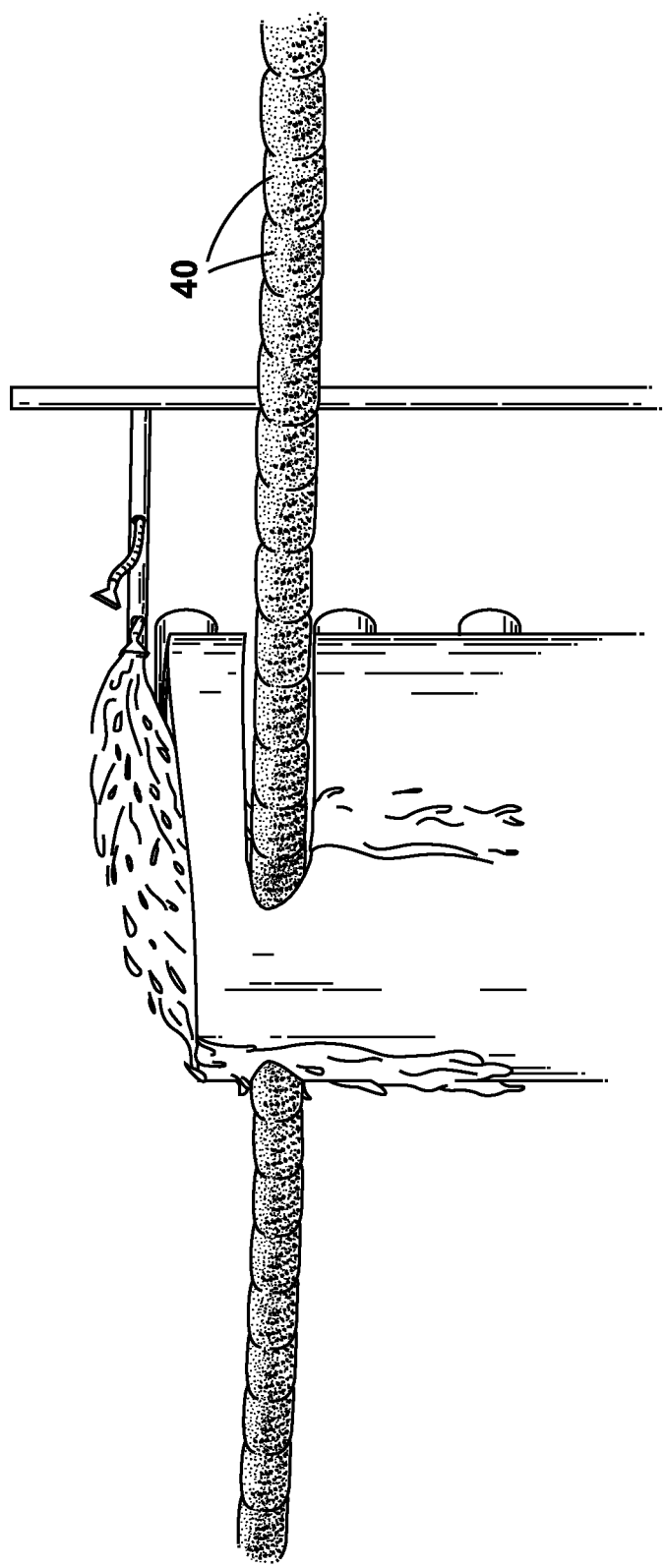
Figure 20:
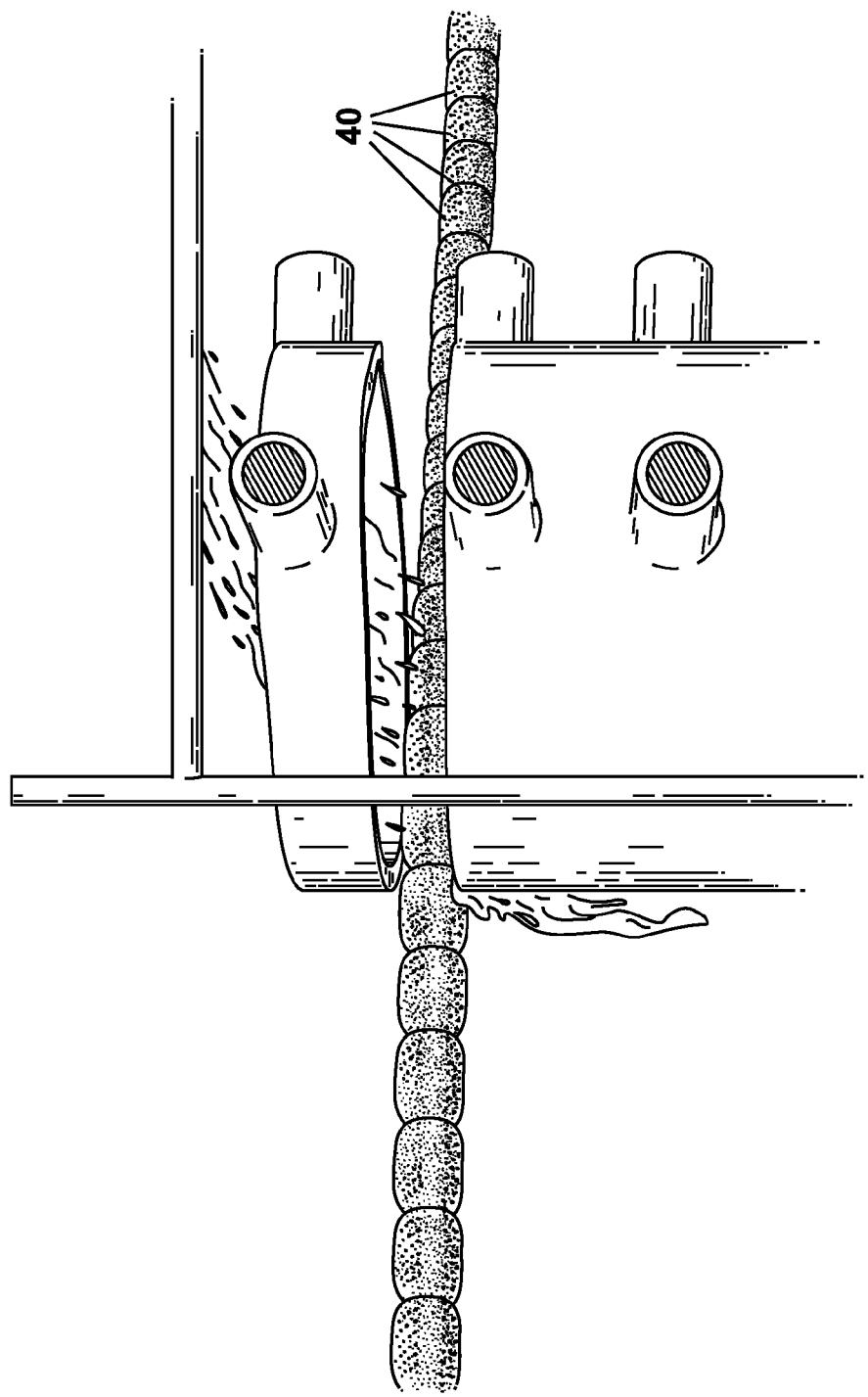
Figure 21:
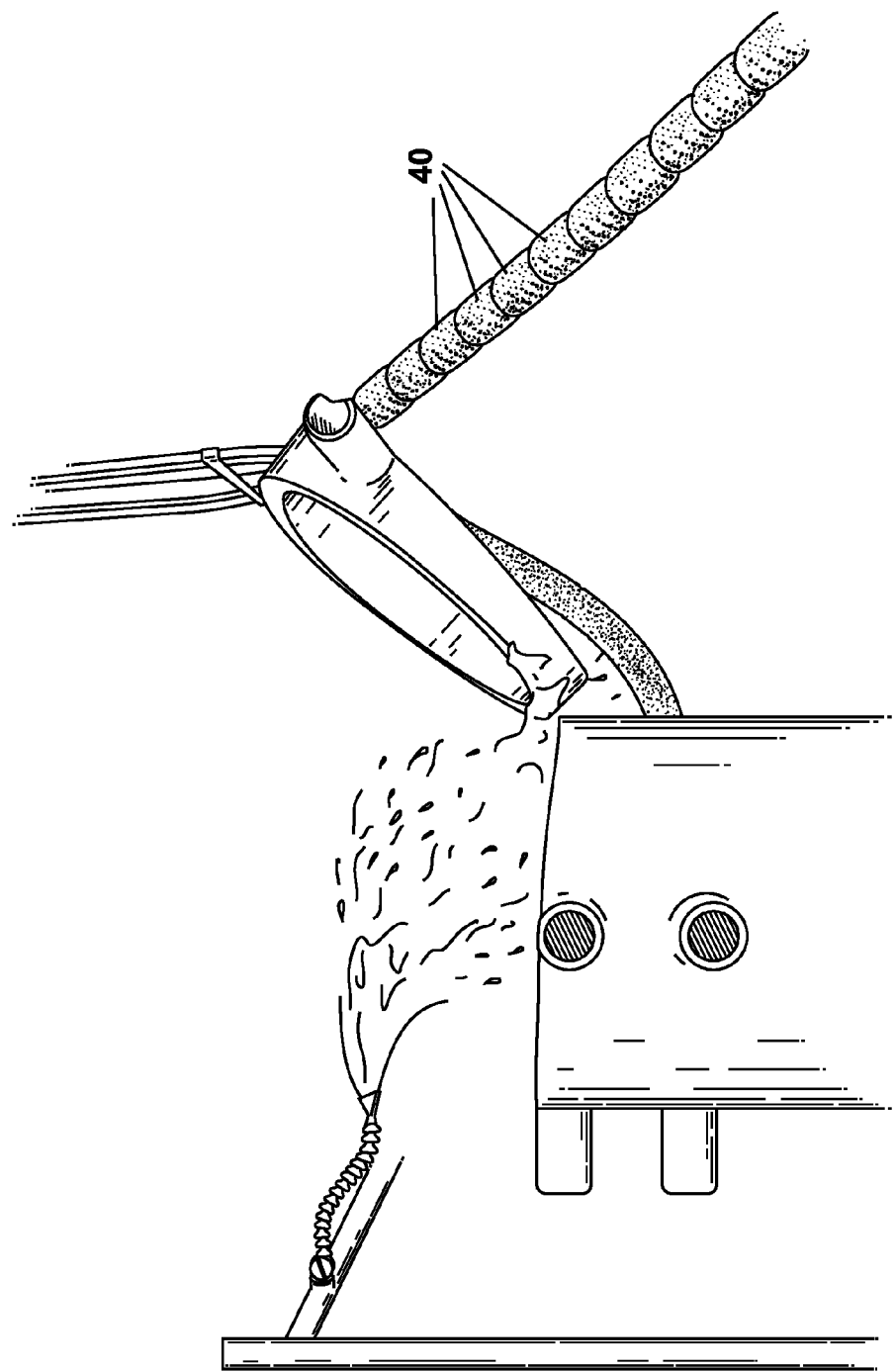

The cutting cable 35 can be a thick wire rope such as 2-3 inch diameter wire rope fitted with a plurality of cutting members 40. In FIG. 14, each cutting member 40 can be a cylindrically shaped sleeve 41 having a bore that receives wire rope 35 and an outer surface that is covered with a plurality of helical projections 42. Each projection 42 is covered with tungsten carbide cutting elements 43. Each of the cutting members 40 is mounted upon cable 35, one against the other as shown in FIGS. 15-16. A plurality of the cutting members 40 are mounted on the cable 35 next to each other as shown in FIG. 15-21. Clamps, sleeves, wedge locking devices, welding or cable straps can be used to hold the cutting members in position on the cable 35. In one embodiment, clamps, sleeves, or wedge locking fittings are placed on each end of the plurality of cutting members such as at the position marked as 46 in FIG. 16.

Figure 12:
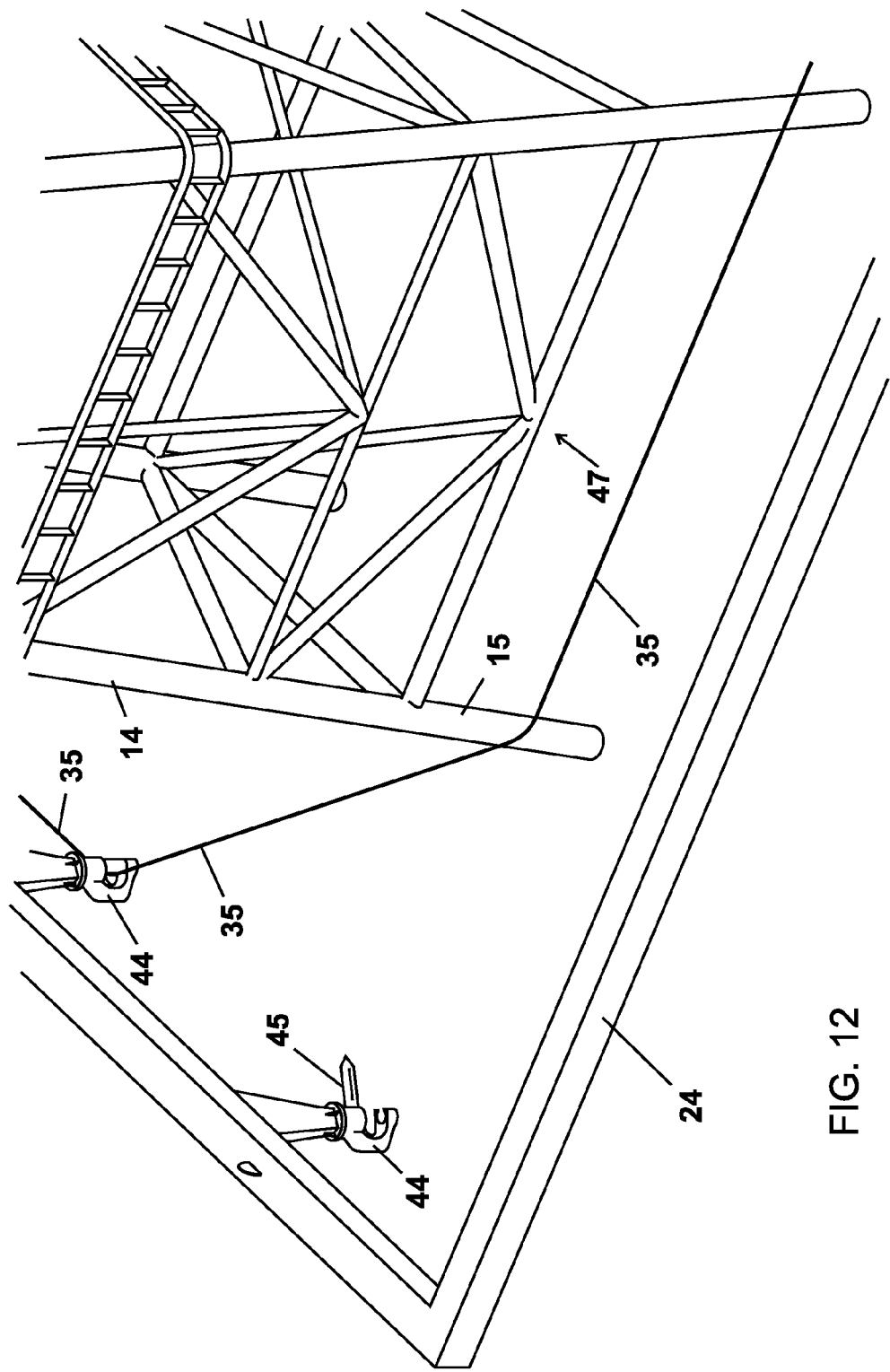
FIG. 12 is a partial perspective view of a preferred embodiment of the apparatus of the present invention.
Figure 13:
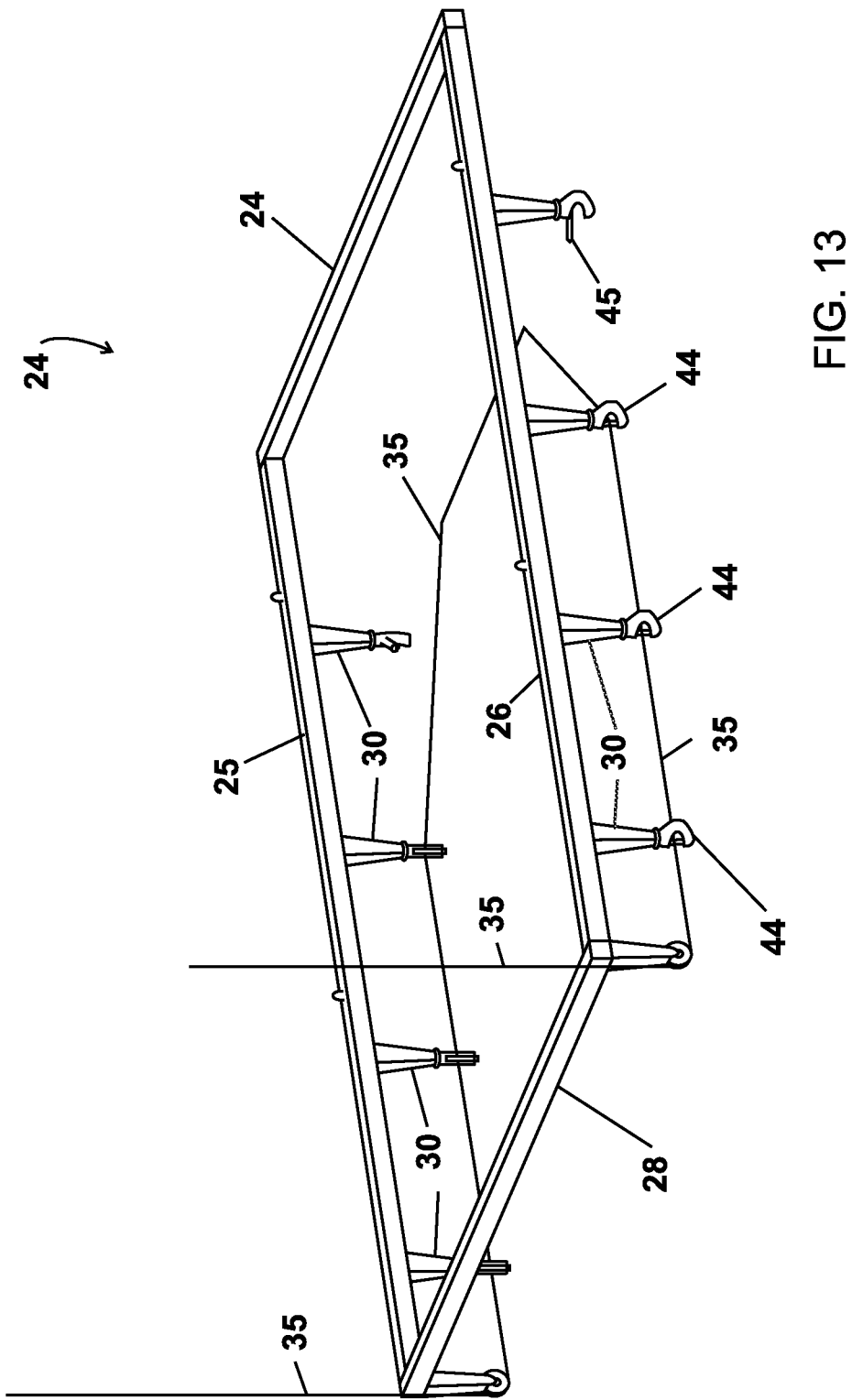
FIG. 13 is a partial perspective view of a preferred embodiment of the apparatus of the present invention.

The cable 35 is moved using the winches 38, 39 to move the cable 35 back and forth while the cable is butted up against the platform 14 jacket 15 as shown in FIG. 12. Each of the post 30 is fitted with an eyelet 44 through which the cable 35 is threaded as shown in FIGS. 10 and 13. Each of the eyelets 44 has a movable member 45 that can be opened for releasing the cable 35 such as when it is about to cut through a portion of the jacket 15 as seen in FIG. 12.

The winches 38, 39 can be programmed so that as when one winch 38 on barge or vessel 19 is paying out the cable 35, the other winch 39 on the barge or vessel 20 is winding in cable 35. This procedure is then reversed wherein the cable 35 wound upon winch 39 is paid out and the cable 35 wound upon winch 38 is wound upon the winch 38. In order to advance the cable 35 through the various members of the jacket 15, the cable 35 can be advanced in the direction of arrow 47 in FIG. 12 until all of the members of the platform and jacket 15 that extend below the mudline 12 are severed. As needed, the eyelets 44 can be opened using the movable member 45 in order to continuously advance the cable 35 through the members of the jacket 15 of platform 14. The winches 38, 39 can also take up any slack of cable 35 as it continues to cut through the various members of jacket 15 of platform 14 that are below mudline 12.

FIGS. 17-21 illustrate cutting of a tubular member or pipe 48 using the cutter cable member 40 of the apparatus of the present invention.

The following is a list of parts and materials suitable for use in the present invention:

| PARTS LIST: | |
|---|---|
| PART NUMBER | DESCRIPTION |
| 10 | marine platform removal system |
| 11 | seabed |
| 12 | mudline |
| 13 | water surface |
| 14 | marine platform |
| 15 | jacket |
| 16 | deck area |
| 17 | heliport |
| 18 | lifting apparatus |
| 19 | vessel/hull |
| 20 | vessel/hull |
| 21 | frame |
| 22 | frame |
| 23 | space |
| 24 | frame |
| 25 | side beam |
| 26 | side beam |
| 27 | end beam |
| 28 | end beam |
| 29 | open center |
| 30 | post/column |
| 31 | post/column |
| 32 | pulley/sheave |
| 33 | corner |
| 34 | corner |
| 35 | cutting cable |
| 36 | section |
| 37 | section |
| 38 | winch |
| 39 | winch |
| 40 | cutting member |
| 41 | cylindrical sleeve |
| 42 | helical projection |
| 43 | tungsten carbide element |
| 44 | eyelet |
| 45 | moving member |
| 46 | position |
| 47 | arrow |
| 48 | pipe/tubular member |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of removing an abandoned marine platform that extends below a seabed mud line comprising the steps of:
   a) providing a frame having a perimeter that surrounds an open center, wherein the frame has a first winch and a second winch;
   b) fitting a cutter cable to the frame, wherein the cable is wound upon the winches, a first cable end portion wound upon the first winch and a second cable end wound on the second winch;
   c) lowering the frame over the platform wherein the platform occupies the open center portion;
   d) wherein in step "c" at least a part of the cutter cable is positioned below the mud line;
   e) using the first and second winches to move the cable to cut the platform below the mud line; and
   f) removing the cut platform section from the seabed.

2. The method of claim 1 wherein in step "b" the cutter cable includes portions that extend to the water surface area and in step "c" a floating lifting apparatus lowers the frame, the floating lifting apparatus supporting said first and second winches.

3. The method of claim 1 wherein step "d" includes moving the cable in a first direction and then moving the cable in a second direction.

4. The method of claim 3 wherein step "d" includes moving the cable in a first direction and then moving the cable in a second direction that is generally opposite the first direction.

5. The method of claim 1 wherein the frame has an upper portion and a plurality of posts that extend downwardly from the upper portion.

6. The method of claim 1 wherein the frame is generally rectangular, and the open center portion is generally rectangular.

7. A method of removing an abandoned marine platform that extends below a seabed mud line comprising the steps of:
   a) providing a frame having a perimeter that surrounds an open center;
   b) fitting a cutter cable to the frame;
   c) lowering the frame over the platform wherein the platform occupies the open center portion;
   d) wherein in step "c" at least a part of the cutter cable is positioned below the mud line;
   e) moving the cable to cut the platform below the mud line;
   f) wherein in step "b" the cutter cable includes portions that extend to the water surface area and in step "c" a floating lifting apparatus lowers the frame, the floating lifting apparatus having one or more winches connected to the cutter cable for moving the cutter cable; and
   g) wherein the floating lifting apparatus includes two vessels, each vessel having a winch, and wherein an end portion of the cutter cable is wound upon a said winch.

8. The method of claim 7 wherein the step of moving comprises winding up cable on one winch while paying out cable from the other winch.

9. A method of removing an abandoned marine platform that extends below a seabed mud line comprising the steps of:
   a) providing a frame having a perimeter that surrounds an open center;
   b) fitting a cutter cable to the frame;
   c) lowering the frame over the platform wherein the platform occupies the open center portion;
   d) wherein in step "c" at least a part of the cutter cable is positioned below the mud line;
   e) moving the cable to cut the platform below the mud line; and
   f) wherein the frame has an upper portion and a plurality of eyelets that are spaced below the upper portion.

10. The method of claim 9 wherein the cutter cable is routed through each of the eyelets.

11. The method of claim 9 wherein the eyelets can be opened and closed.

12. A method of removing an abandoned marine platform that extends below a seabed mud line comprising the steps of:
   a) providing a frame having a perimeter that surrounds an open center;
   b) fitting a cutter cable to the frame;

c) lowering the frame over the platform wherein the platform occupies the open center portion;
d) wherein in step "c" at least a part of the cutter cable is positioned below the mud line;
e) moving the cable to cut the platform below the mud line; and
f) wherein the cutter cable includes a plurality of sleeves placed upon a wire rope cable.

13. The method of claim 12 wherein the sleeves have an outer coating of tungsten carbide members.

14. A method of removing an abandoned marine platform that extends below a seabed mud line comprising the steps of:
a) providing a frame having a perimeter that surrounds an open center, the frame including a first winch and a second winch;
b) lowering the frame over the platform wherein the platform occupies the open center portion;
c) using the frame to support a movable cutter cable, wherein a first cable end portion is wound upon the first winch and a second cable end portion is wound upon the second winch;
d) wherein in step "c" at least a part of the cutter cable is positioned below the mud line;
e) after step "d", moving the cable, through use of the first and second winches, relative to the frame to cut the platform below the mud line; and
f) removing the cut platform section from the seabed.

15. The method of claim 14 wherein in step "e" the cable is pulled in a first direction and then a second direction while engaging the platform to be cut.

16. A method of removing an abandoned marine platform that extends below a seabed mud line comprising the steps of:
a) providing a frame having a perimeter that surrounds an open center;
b) lowering the frame over the platform wherein the platform occupies the open center portion;
c) using the frame to support a movable cutter cable;
d) wherein in step "c" at least a part of the cutter cable is positioned below the mud line;
e) after step "d", moving the cable relative to the frame to cut the platform below the mud line; and
f) wherein the platform has multiple leg members and the cable is moved back and forth until each leg member of the platform is cut.

17. A method of removing an abandoned marine platform that extends below a seabed mud line comprising the steps of:
a) providing a frame having a perimeter that surrounds an open center;
b) lowering the frame over the platform wherein the platform occupies the open center portion;
c) using the frame to support a movable cutter cable;
d) wherein in step "c" at least a part of the cutter cable is positioned below the mud line;
e) after step "d", moving the cable relative to the frame to cut the platform below the mud line; and
f) wherein the platform includes a jacket that has multiple vertical or inclined members and the cable is moved back and forth until each vertical and inclined member of the jacket is cut.

18. A method of removing an abandoned marine platform that extends below a seabed mud line comprising the steps of:
a) providing a frame having a perimeter that surrounds an open center;
b) lowering the frame over the platform wherein the platform occupies the open center portion;
c) using the frame to support a movable cutter cable;
d) wherein in step "c" at least a part of the cutter cable is positioned below the mud line;
e) after step "d", moving the cable relative to the frame to cut the platform below the mud line; and
f) wherein the platform is anchored to the seabed with multiple piling members and the cable is moved back and forth until each piling member of the platform is cut.

19. A method of removing an abandoned marine platform that extends below a seabed mud line comprising the steps of:
a) providing a frame having a perimeter that surrounds an open center;
b) lowering the frame over the platform wherein the platform occupies the open center portion;
c) using the frame to support a movable cutter cable;
d) wherein in step "c" at least a part of the cutter cable is positioned below the mud line;
e) after step "d", moving the cable relative to the frame to cut the platform below the mud line; and
f) wherein the frame includes a pair of side beams and a pair of end beams, there being a plurality of frame corners, each corner defined by a connection of one beam to another beam, and further comprising extending a plurality of posts downwardly from the said beams, and wherein each post has a fitting and further comprising connecting the cutter cable to the fittings.

20. A method of removing an abandoned marine platform that extends below a seabed mud line comprising the steps of:
a) providing a frame having a perimeter that surrounds an open center, wherein the frame has a first winch and a second winch;
b) fitting a cutter cable to the platform, wherein the cable is wound upon the winches, a first cable end portion wound upon the first winch and a second cable end portion wound on the second winch;
c) lowering the frame over the platform wherein the abandoned marine platform occupies the frame open center;
d) using the first and second winches to move the cable to cut the platform, wherein one winch winds up the cable while the other winch pays out the cable; and
e) removing the cut platform section from the seabed.

21. The method of claim 20 wherein in step "b" the cutter cable includes portions that extend to the water surface area and in step "c" a floating lifting apparatus lowers the frame.

22. The method of claim 20 wherein step "d" includes moving the cable in a first direction and then moving the cable in a second direction.

23. The method of claim 20 wherein step "d" includes moving the cable in a first direction.

* * * * *